June 2, 1936.   E. D. TILLYER   2,042,565
MEANS AND METHOD OF ALIGNING AND HOLDING LENS ELEMENTS
Filed Dec. 16, 1933
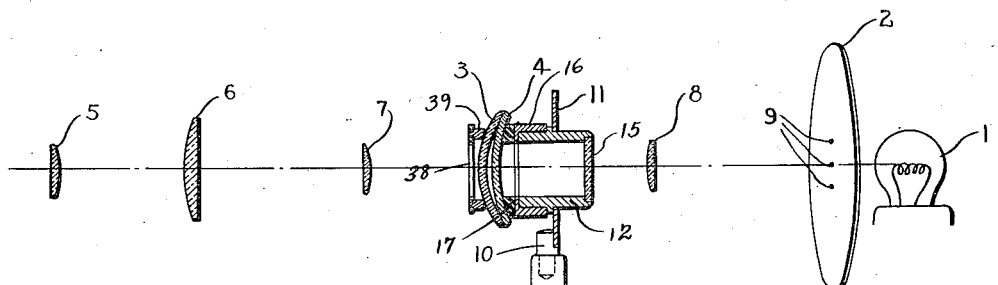
FIG. I.
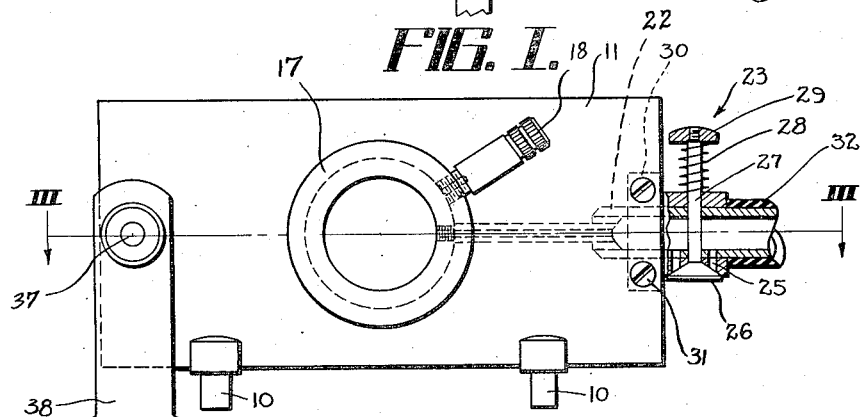
FIG. II.
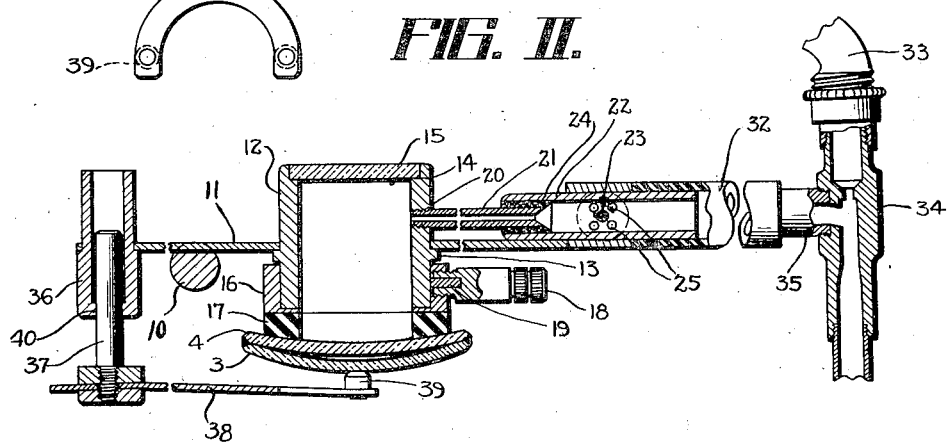
FIG. III.
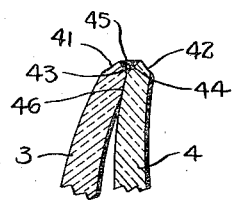
FIG. IV.
INVENTOR
Edgar D. Tillyer.
BY
Harry H. Stull
ATTORNEY Patented June 2, 1936

2,042,565

UNITED STATES PATENT OFFICE 2,042,565

MEANS AND METHOD OF ALIGNING AND HOLDING LENS ELEMENTS

Edgar D. Tillyer, Southbridge, Mass., assignor to American Optical Company, Southbridge, Mass., a voluntary association of Massachusetts Application December 16, 1933, Serial No. 702,697

14 Claims. (Cl. 88—56)

This invention relates to improvements in aligning and holding means and has particular reference to improved means and method of aligning and holding the lens elements of a compound lens.

One of the principal objects of the invention is to provide improved means and method of aligning the axes of the lens elements of a compound lens and of holding said elements in said aligned relation.

Another object is to provide improved means and method of aligning and temporarily holding the separate lens elements of a compound lens so that the surface of the first lens element on which the second element is to be placed and aligned will be free to receive said second element and so that the said second element may be placed in proper superimposed and aligned relation with the first element without altering the adjustment of said first element, and also to provide means whereby the separate aligned lens elements may be permanently secured together in said aligned relation before they are removed from the temporary holding means.

Another object of the invention is to provide improved means and method of supporting the lens elements on a holder by combined suction and mechanical holding means.

Other objects and advantages of the invention will become apparent from the following description taken in connection with the accompanying drawing and it will be apparent that many changes and modifications may be made in the various details of construction, arrangement of parts and steps of the process shown and described without departing from the invention as expressed in the accompanying claims. I therefore do not wish to be limited to the exact details and steps of the process shown and described as preferred forms only have been shown by way of illustration.

Referring to the drawing:

Fig. I is a diagrammatic view of a device embodying the invention;

Fig. II is an enlarged front elevation of the lens holding means shown in Fig. I;

Fig. III is a cross section taken on lines III—III of Fig. II looking in the direction indicated by the arrows; and Fig. IV is a fragmentary sectional view showing the edges of the aligned lens elements sealed.

It has been very difficult in the past to align the axes of the lens elements of a compound lens, so that the said axes will be in proper prescriptive relation with each other when worn by the patient.

One of the main difficulties was that the axes of the lens elements had to be located separately of each other, that is, the axis of one of the lens elements had to first be located and said element had to be held in its located position until the axis of the other lens element was located and held aligned therewith until the said elements were permanently secured together. The difficulty was in providing means whereby the surface of the first element which receives the second element would be free of obstructions so as to allow the said second element to be placed in proper superimposed and aligned relation therewith and without altering its adjustment and so that the said elements could be temporarily held in said relation until they were permanently secured together.

One of the principal objects, therefore, of the present invention is to provide improved means and method of aligning and temporarily supporting the separate lens elements of a compound lens so that they may be placed in proper superimposed and prescriptive relation with each other and to provide means by which they may be permanently secured together in this relation before they are removed from the temporary supporting means.

Referring more particularly to the drawing wherein like reference characters designate like parts throughout the several views, the device embodying the invention is adapted particularly for use with an instrument such as is shown diagrammatically in Fig. I. This instrument comprises a source of illumination 1 having a perforated target 2 aligned therewith which is adapted to be viewed through the lens elements 3 and 4 which are to be placed in aligned relation with each other by sighting through the eyepiece lenses 5 and 6, the telescopic lens 7 and target focussing lens 8.

The lenses 5 and 6 are of the usual type used in forming the eyepiece of an instrument. The lens 7 is focused either distant or near as desired, to make the image of the target larger. The lens 8 is adapted to change the convergence of the light from the target 2 so that when the target 2 is moved, the convergence or divergence of light reaching the lens elements 3 and 4 can be adjusted to bring the image of the target 2 in focus with the lens system 5, 6, and 7. This compensates for the power of the lens elements 3 and 4.

The target 2 is preferably opaque and is provided with a plurality of aligned pin holes 9 which during the aligning of the lens elements are adapted to be brought partially into focus and the elongations thereof formed by the cylinder power present in the lens element 3 and 4 are adapted to be moved into aligned relation with each other and indicate the true axis of the lens. This is brought about by first adjusting the traget 2 so that the pin holes therein will lie in the desired meridian and by then moving the lens element 3 or 4 as the case may be, until the elongations of the pin holes 9 formed by the cylinder power present in said element are moved into aligned relation with each other.

The lens elements 3 and 4 are adapted to be separately aligned with the target 2, that is, the lens element 4 is first located in accurate position by moving it into proper aligned relation with the target 2, and the lens element 3 is then placed in superimposed relation with the lens element 4 and is likewise moved into aligned relation with the target 2. The lens elements are then clamped together in this aligned relation and the peripheral edges thereof are permanently united to maintain said aligned relation. To provide means whereby the lens elements 3 and 4 may be separately supported in aligned relation with the target 2, applicant has devised a holding member comprising a base support 10 having a plate member 11 secured thereto. The plate 11 is provided with a central opening in which is mounted an annular tubular member 12 having a shoulder 13 engaging the plate 11, and which is secured to said plate by solder or like means to hold the parts in proper relation with each other.

The annular tubular member 12 is provided adjacent the rear end thereof with a shouldered seat 14 in which is fitted a transparent plate 15 of glass or other suitable means. The plate 15 is sealed within the seat 14 to provide an air tight connection. The opposite or front end of the tubular member 12 is provided with a shouldered sleeve member 16 having a pad of rubber or the like 17 secured to the shouldered end thereof to provide a resilient cushion contact for the lens element 4. This sleeve member 16 is closely fitted to the tubular member 12 and is sealed along its engaging surface with the member 12 by oil or the like to form an adjustable but air tight connection. The sleeve 16 is mounted on the member 12 so that it may rotate thereon and is provided with a clamp screw 18 by means of which it may be locked in desired adjusted position. The clamp screw 18 is provided with a contact member 19 formed of lead or other suitable material which will not injure the surface of the member 12 when the screw 18 is tightened. The member 12 is provided with an opening 20 in the side wall thereof in which a pipe member 21 is threadedly connected. The pipe member 21 extends within the stem 22 of a valve 23, and is tightly secured therein by a packing 24. The valve 23 comprises a plurality of openings 25 having a disc member 26 fitted thereover. The disc member 26 is mounted on a plunger 27 slidably mounted on the member 23 having the openings 25 therein and is urged into engagement with said member by a spring 28. The plunger 27 is provided with a fingerpiece 29 by means of which it may be compressed against the action of the spring member 28 to open the valve. The spring 28 normally tends to keep the valve closed.

The valve stem 22, as shown in Fig. II, is secured to a plate 30 which is attached by screws or like means 31 to the main support plate 11.

A hose 32 is connected to the valve stem 22 adjacent its end opposite the pipe 21 and is adapted to provide a pipe line by which the internal chamber of the annular tubular member 12 may be connected to vacuum creating means such as illustrated at 34 and which is connected with a water faucet or like means 33 to create the vacuum. The member 34 is provided with a water passageway which runs transversely to an opening in a stem member 35 and when the faucet is opened the water traversing the stem 35 is adapted to cause air to be sucked outwardly of the annular tubular member 12 through the pipe 21, valve stem 22 and hose 32. This provides means whereby the lens 4 placed on the resilient annular contact 17 will be held on said member by suction.

The main support plate 11 is provided adjacent its end opposite the valve stem 22 with a tubular support 36 in which is pivotally mounted a pivot rod 37 having a resilient clamp member 38 thereon. The clamp member 38 is provided with spaced contact members 39 which are held in engagement with the lens element 3 by pressing the pivot rod 37 inwardly of the tubular support 36 until the desired degree of pressure is applied to the contact 39. The rod 37 which engages the tubular member 36 only at the shouldered end 40 is adapted to frictionally bind with said shouldered end and support the clamp 38 in its adjusted position. It is apparent that the resiliency of the member 38 will constantly tend to tilt the rod 37 sidewise and cause the said rod to bind with the shouldered edge 40. When not in use the clamp member 38 is swung downwardly out of the way to a position such as shown in Fig. II.

The general operation of the device and the method of aligning the lens elements in proper prescriptive relation with each other is as follows:

The faucet 33 is turned on to cause a vacuum suction which constantly draws the air outwardly of the internal chamber of the annular tubular support 12. The line of pin holes 9 in the target member 2 is then moved to the desired meridian at which the axes of the lenses are to be placed. The lens element 4 is then placed on the annular resilient pad 17 and is frictionally held thereon by the suction created by the running water from the faucet 33. The lens element 4, of course, is moved sidewise with respect to the pad to properly center the lens thereon and is then rotated by grasping the member 18 and turning the sleeve 16 on the member 12 until the elongated images of the pin holes produced by the cylindrical power of the lens element 4 are moved into aligned relation with each other. This automatically locates the axis of the lens element in its accurate prescriptive position. It is to be understood that the pin holes are first brought into focus by adjustment of the target member towards and away from the lens 8. After the lens element 4 has been properly located the clamp screw 18 is tightened to secure it rigidly in said position, it being understood that it is rigidly held on the cushion pad 17 by the vacuum suction. The lens element 3 is then placed in superimposed relation with the lens element 4 and is manually rotated about the axis of the annular tubular member 12 until the images of the pin holes are aligned with each other in a manner similar to that described above. This member also has a cylindrical power and will likewise cause the images of the pin holes 9 to be elongated so that they may be aligned and likewise locate the proper prescriptive position of the axis of the member 3. After the member 3 has been carefully located, the clamp member 38 is swung into position and the pivot rod 37 is compressed until the contact members 39 engage and exert a pressure on the lens element 3. This holds the said lens element in proper relation with the lens element 4. The complete holder may then be removed from the instrument by lifting the base supports 10 out of their supporting means on the instrument so that the edges of the lens elements 3 and 4 may be permanently sealed together, it being understood that the edges of said elements have been properly beveled, sized and fitted with respect to each other previous to the aligning thereof and that the said edges are so beveled as to provide a peripheral groove about the edge of the lens elements in which a suitable sealing compound 45 may be placed to permanently secure the lenses together. After the lens elements have been properly aligned and permanently united the spring clamp member 38 is swung out of alignment with the lens element 3 and the valve member 23 is compressed to release the vacuum holding action on the lens element 4. The composite lens elements may in this manner be quickly and easily removed from the holding member and will be in proper prescriptive relation with each other and ready for use. If desired the holding member may be provided with suitable indication means for locating the position at which the compound lens is to be held during use and by which the said elements may be definitely marked to permanently locate said position prior to their being removed from the holder.

It is apparent that instead of using a resilient cushion pad member 17 and a vacuum to hold the lens element 4 in position on said pad, the said member 17 may be formed of a wax or other suitable adhesive composition, to which the lens will adhere by exerting a pressure thereon after it has been properly adjusted relative to the target 2. In either instance it is apparent that the lens element 4 will be supported so that the outer surface thereof on which the element 3 is placed, will be free of obstructions so that the said element 3 may be placed in proper prescriptive relation therewith and be permanently secured in said relation prior to its being removed from the temporary holding means.

In Fig. IV the lens elements are shown as being provided at their peripheral edges with the beveled outer faces 41 and 42 which are so beveled as to fit the groove in the lens rim in which they are to be supported before the eyes of the wearer. On the edges of the contiguous faces of said elements there is provided the beveled faces 43 and 44 which when the said elements are placed in superimposed relation with each other, are adapted to form a peripheral groove in which a sealing compound of any suitable means 45 may be placed to secure the said elements in superimposed relation with each other. One of the contiguous faces of the lens elements, preferably the element 3 is provided with a seat 46 which is shaped substantially to the same curve as the engaging surface of the member 4 on which the member 3 is placed. This arrangement provides means whereby variations in the surface curvatures of the contiguous faces of the members 3 and 4 may be compensated for and also provides means whereby the said elements 3 and 4 may be placed in proper fitted relation with each other.

It is to be understood that during the use of the device the operator sights through the lens system of the instrument, through the lens elements 3 and 4 and through the transparent member 15, and that all of these parts are in axially aligned relation with each other.

It is also apparent that although applicant has shown and described the use of water to create the vacuum suction any suitable and known means may be used.

From the foregoing it will be seen that I have provided simple, efficient and economical means and process of carrying out all of the objects and advantages of the invention, particularly that of providing improved means and methods whereby the axes of the lens elements of the compound lens may be aligned and held while their edges are secured to retain them in said aligned relation.

Having described my invention I claim:

1. In a device of the character described the combination of a hollow member having a lens supporting edge, means associated therewith for positively holding a surface of a lens element on said edge so that the opposite surface of said lens element is free to receive another lens element and so that vision through the central area of said element is not obstructed, and spring pressed means movable into and out of alignment with the hollow member for resiliently engaging and supporting the second lens element in aligned relation with the first.

2. In a device of the character described the combination of a hollow member having a lens supporting edge, means associated with said hollow member for creating a vacuum suction to hold a surface of a lens element on said edge so that the opposite surface of said lens element is free to receive another lens element and so that vision through the central area of said lens element is not obstructed, and spring pressed means movable into and out of alignment with the hollow member for resiliently engaging and supporting said other lens element in aligned relation with the first.

3. In a device of the character described the combination of a chart having aligning means, sight means aligned with said chart and means between said sight means and chart for engaging a surface of and for positively supporting a lens element to be aligned with the aligning means by sighting through said lens element so that the opposite surface of the lens element is free to receive another lens element and so that vision through the central area of the lens element is not obstructed, and means movable into and out of alignment with the supporting means for exerting a pressure on and for supporting said other lens element in aligned relation with the first and so that it may be sighted through to be aligned with the aligning means and with the first lens element without altering the adjustment of the first lens element.

4. In a device of the character described a tubular member having a hermetically sealed transparent wall mounted adjacent one end thereof and cushion type lens supporting means adjacent its opposite end and means associated with said hollow member for creating a vacuum suction to hold a lens member on said cushion.

5. In a device of the character described a tubular member having a hermetically sealed transparent wall adjacent one end thereof and a lens support adjacent its opposite end, means associated with said tubular member for creating a vacuum suction for retaining a lens element on the lens support and means movable into and out of alignment with the tubular member for mechanically exerting and maintaining a pressure on a second lens element to support said element in aligned relation with the first.

6. In a device of the character described the combination of means for separately supporting a lens element by surface contact with one of its optical faces so that its opposite optical face is free to receive another lens element and means for mechanically exerting and maintaining a pressure on said other lens element to support it in superimposed relation with the first, said last named means being adapted to cooperate with the first supporting means to hold the separate lens elements in aligned superimposed relation with each other when the holding action of the first supporting means is released.

7. In a device of the character described, a member having a hollow chamber with a hermetically sealed transparent wall and an adjustable lens support thereon, means connected with said hollow chamber to create a vacuum suction in said chamber to retain a lens on the adjustable lens support and means to rotate the adjustable lens support and the lens held on said support by the vacuum suction so that the said lens may be adjusted to different positions without releasing the holding action of the vacuum suction means.

8. The method of aligning the axes of and of uniting the lens elements of a compound lens comprising securing one lens element to a holding member so that vision through its central area is unobstructed, rotating said holding member and lens element while sighting through said element to align its axis with axis aligning means, fixing the holding member and first lens element in adjusted position, placing another lens element in aligned position with said first lens element, rotating said second lens element until the axes of the said two elements coincide, fixing the said lens elements in this relation, and placing sealing means along the edges of said two elements to secure them together to retain their aligned relation.

9. The method of aligning the axes of and of uniting the lens elements of a compound lens comprising securing one of the lens elements to a holding member so that one of its surfaces will be free to receive another lens element and so that vision through its central area is unobstructed, rotating said holding member and lens element while sighting through said lens element to align its axis with axis aligning means, fixing the holding member and first lens element in their adjusted position, placing another lens element in superimposed relation with the free surface of the first element, rotating said second lens element until the axes of the said two elements coincide, fixing the said lens elements in this relation, and placing an adhesive along the edges of said two elements to secure them together to retain their aligned relation.

10. The method of aligning the axes of and of uniting the lens elements of a compound lens comprising shaping the said elements to substantially the same size and shape, and so that their edges will form a peripheral groove when fitted together, securing one lens element to a holding member, rotating said holding member and lens element until the axis of said element is aligned with aligning means, fixing the holding member and lens element in this position, supporting another lens element in superimposed relation with the first lens element, rotating said second lens element until the axes of the said two elements are in aligned relation with each other, fixing the said elements in this relation, and placing an adhesive in the peripheral groove at the edges of said two elements to peripherally secure them together to retain said relation and thereafter removing the united lens elements from the holding members for use.

11. The method of aligning the axes of and of uniting the lens elements of a compound lens comprising edging the said elements to substantially the same size and shape and so that their edges will form a peripheral groove when fitted together, securing one of the lens elements to a holding member so that one of its surfaces will be free to receive another lens element, rotating said holding member and lens element until the axis of the said element is aligned with aligning means, fixing the holding member and lens element in this position, placing another lens element in superimposed relation with the free surface of the first element, rotating said second lens element until the axes of the said two elements are in aligned relation with each other, fixing the said elements in this relation, and placing adhesive means in the peripheral groove formed at the edges of the said two elements to peripherally secure them together to retain said relation and thereafter removing the united lens elements from the holding members for use.

12. In a device of the character described, the combination of a hollow member having a lens supporting edge, means associated therewith for positively holding a surface of a lens element on said edge so that the opposite surface of said lens element is free to receive another lens element and so that vision through the central area of said lens element is not obstructed, and mechanical means associated with said hollow member and movable into engagement with the second lens element when it is in superimposed and aligned relation with the first element and having means associated therewith for exerting a constant pressure on said second lens element when the mechanical means is moved into engagement therewith and released by the operator to hold said elements in said aligned relation.

13. In a device of the character described, the combination of a support member having a lens supporting edge, means associated therewith for positively holding a surface of a lens element on said edge so that the opposite surface of said lens element is free to receive another lens element and so that vision through the central area of said lens element is not obstructed, and mechanical means associated with said support and movable into engagement with the second lens element when it is in superimposed and aligned relation with the first element and having means associated therewith for exerting a constant clamping action on said second lens element when the mechanical means is moved into engagement therewith and released by the operator to hold said elements in said aligned relation.

14. The method of locating the axes of a plurality of lens elements in prescribed relation to each other and of uniting the lens elements of a compound lens comprising securing one lens element to a holding member so that vision through its central area is unobstructed, moving said holding member and lens element while sighting through said element to align its axis with axis aligning means, fixing the holding member and first lens element in adjusted position, placing another lens element in aligned position with said first lens element, moving said second lens element until the axis thereof is in prescribed relation with the axis of the first element, fixing said lens element in this position and sealing the said elements together along the edges thereof to retain them in said adjusted relation.

EDGAR D. TILLYER.